(12) United States Patent
Suomela et al.

(10) Patent No.: US 7,007,242 B2
(45) Date of Patent: Feb. 28, 2006

(54) GRAPHICAL USER INTERFACE FOR A MOBILE DEVICE

(75) Inventors: Riku Suomela, Tampere (FI); Mika Roykkee, Tampere (FI)

(73) Assignee: Nokia Corporation, Espoo (FI)

( * ) Notice: Subject to any disclaimer, the term of this patent is extended or adjusted under 35 U.S.C. 154(b) by 750 days.

(21) Appl. No.: 10/081,964

(22) Filed: Feb. 20, 2002

(65) Prior Publication Data
US 2003/0156146 A1 Aug. 21, 2003

(51) Int. Cl.
*G06F 3/00* (2006.01)
(52) U.S. Cl. .................................. 715/849; 715/851
(58) Field of Classification Search .............. 345/419, 345/653, 659, 684; 715/834, 849, 851; 725/37, 725/44, 61
See application file for complete search history.

(56) References Cited

U.S. PATENT DOCUMENTS

| | | | | |
|---|---|---|---|---|
| 5,515,486 A | * | 5/1996 | Amro et al. ................. | 715/848 |
| 5,602,566 A | * | 2/1997 | Motosyuku et al. ......... | 345/684 |
| 5,880,717 A | * | 3/1999 | Chan et al. .................. | 345/173 |
| 6,104,381 A | | 8/2000 | Watanabe et al. ........... | 345/160 |
| 6,201,554 B1 | * | 3/2001 | Lands .......................... | 345/169 |
| 6,567,068 B1 | * | 5/2003 | Rekimoto ................... | 345/156 |
| 6,567,101 B1 | * | 5/2003 | Thomas ....................... | 345/649 |
| 6,573,883 B1 | * | 6/2003 | Bartlett ....................... | 345/156 |
| 6,738,042 B1 | * | 5/2004 | Nobukiyo ................... | 345/158 |
| 6,757,002 B1 | * | 6/2004 | Oross et al. ................. | 715/864 |
| 2002/0093483 A1 | * | 7/2002 | Kaplan ........................ | 345/158 |

OTHER PUBLICATIONS

Rekitmoto, Jun et al, " Tilting operations for small screen interfaces", 1996 ACM 0-89791-798-7/96/11 pp. 167-168.*
Harrison, Beverly, et al. " Squeeze me, Hold Me, Tilt Me! An exploration of manipulative user interfaces", 1998 CHI Los Angeles CA. 0-89791-975-0/98/4 pp. 17-24.*
Bartlett, Joel et al," Rock 'n'Scroll is here to stay", MayJun. 2000 IEEE 0272-1716/00 Compaq Computer Corporation, pp 40-45.*
Fishkin, Kenneth, et al. "Embodied User Interfaces for Really Direct Manipulation", Communications of the ACM Sep. 2000/vol. 43 No. 9 pp. 75-80.*
Hinkley, Ken et al., "Sensing Techniques for Mobile Interaction", CHI San Diego 2000 ACM 1-58113-212-3/00/11 pp. 91-100.*

* cited by examiner

*Primary Examiner*—Ba Huynh
*Assistant Examiner*—Steven Theriault
(74) *Attorney, Agent, or Firm*—Perman & Green, LLP

(57) ABSTRACT

The invention relates to a mobile device comprising a display. In order to offer a user a more extensive immediate overview over the information available to a specific topic, it is proposed that the mobile device comprises processing means for presenting on the display a three-dimensional polyhedron as graphical user interface. Different pieces of information that are to be presented to a user of the mobile device are associated to different facets of this polyhedron, and the visible facets of the polyhedron present at least a hint on a respectively associated piece of information to a user of the mobile device. It is further proposed that the mobile device comprises means for enabling a user to cause the processing means to rotate the facets of the presented polyhedron. The invention relates equally to a corresponding graphical user interface and to a corresponding method for presenting such a graphical user interface.

35 Claims, 4 Drawing Sheets

GRAPHICAL USER INTERFACE FOR A MOBILE DEVICE

FIELD OF THE INVENTION

The invention relates to mobile device, on a display of which a graphical user interface (UI) is to be presented. The invention equally relates to a graphical user interface for a mobile device and to a method for presenting a graphical user interface on a display of a mobile device.

BACKGROUND OF THE INVENTION

It is well known in the art that mobile devices, e.g. mobile phones, present information to a user as graphical user interface on a display of the mobile device.

It is further known that it is required in various situations that a mobile device is to be able to present several pieces of information to a specific topic. Such pieces of information can consist for example in several choices or taps offered to a user. For instance, when a user of a mobile phone presses a provided menu button, he/she will be offered a variety of choices like opening a phonebook.

Usually, such information is presented to the user on a two-dimensional (2D) page on the display. In particular with mobile devices having only a small display, the respective page comprises only a very limited portion of the entire information available for the selected topic, the rest of the information not being visible for the user.

This implicates that some information cannot be accessed directly by the user, since a new page offering this information has to be shown first on the display. Possibly, the page offering the desired information will even only be shown after browsing through a sequence of other pages, while the user might not even be aware at the beginning which pieces of information will be presented on further pages.

SUMMARY OF THE INVENTION

It is an object of the invention to offer to a user a more extensive immediate overview over the information available to a specific topic by a mobile device.

This object is reached according to the invention with a mobile device which comprises in addition to a display processing means for presenting on said display a three-dimensional (3D) polyhedron as graphical user interface. Different pieces of information that are to be presented to a user of said mobile device are associated to different facets of said polyhedron. Further, visible facets of the polyhedron present at least a hint on a respectively associated piece of information to the user. Presenting at least a hint on a respectively associated piece of information can mean for instance presenting the entire associated information, presenting a selected part of the associated information, or presenting a small graphical representation of an associated textual information, like a telephone icon for the choice 'phonebook'. The proposed mobile device comprises in addition means for enabling a user to cause the processing means to rotate the facets of the presented polyhedron.

The object is also reached according to the invention with a corresponding graphical user interface.

Finally, the object is reached according to the invention with a corresponding method.

The invention proceeds from the idea that an extensive overview can be presented to a user if the information is shown distributed to the facets of a polyhedron, which polyhedron is shown to the user as a 3D image. By providing the user with the possibility of rotating the facets of the polyhedron, he/she can focus on any piece of information by putting the respective facet in plan view, while several facets are always visible at the same time.

It is thus an advantage of the invention that it allows a user to get a preview of at least a great extend of the information available in the current user context, i.e. for a topic that was selected automatically by the mobile device or for a topic that was selected by the user.

Preferred embodiments of the invention become apparent from the dependent claims.

The structure of the polyhedron could be fixed and have e.g. the maximal number of facets that might be required for presenting information. Advantageously, however, the respective structure is determined by the processing means based on the number of facets required in the current status of the device for presenting all available pieces of information.

In a further embodiment of the invention, the number of facets might be variable, but limited to a maximum number. The maximum number of facets could also be selectable by a user to comply with his/her preferences. There could even be provided a possibility for a user to fix the allowed minimum and maximum number of polyhedron facets, or even to choose an entire set of allowed numbers of polyhedron facets. If users use e.g. a joystick to rotate the polyhedron, it would be an advantage if they could set the allowed facet numbers. The joystick can easily be used to point into 4 or 8 directions, so a maximum number of 4 or 8 could be set as the maximum number of side facets surrounding a main center facet. It might moreover be annoying to some people when there are for example 6 side facets, if no sensor is present, since in this case, 2 rotations are required to move some of the side facets into the center. In case the user is allowed to determine that only 4 or 8 side facets are allowed, he/she can then access all facets with one directional change only. If for example only 6 side facets are required for presenting the available pieces of information, a polyhedron with 8 side facets is used with two empty facets.

In either case, the number of facets of the polyhedron can e.g. be selected such that all required or possibly required facets are visible at the same time. In case the pieces of information are distributed only to the visible facets of a presented polyhedron, rotating the facets of the polyhedron should imply a rotation of only the visible facets. Thus, after a rotation the same facets are visible as before only with a different distribution, and no piece of information is hidden due to an association to a hidden facet.

Alternatively, the number of facets can be selected e.g. such that some pieces of information may have to be associated to hidden facets. In this case, the pieces of information associated to hidden facets can obviously be seen only by rotating all facets of the polyhedron, not only the visible facets.

As mentioned above, there is not necessarily a piece of information associated to all facets or to all visible facets.

The graphical user interface can further be realized as convex or concave polyhedron, or, from another perspective, the user can presumably be located either outside of a convex polyhedron or inside of a convex polyhedron watching the surrounding facets.

Moreover, the means for enabling a user to cause the processing means to rotate the facets of a presented polyhedron can be realized in a variety of ways.

They may consist for example in input means, e.g. a number of buttons or a joystick, enabling a rotation in all required directions.

Alternatively, the means for enabling a user to cause the processing means to rotate the facets can comprise e.g. a movement detection sensor. A user then simply has to turn the device slightly into the direction in which the polyhedron is to rotate. Alternatively, it can be provided that the device has to be turned in an opposite direction than the direction in which the polyhedron is to rotate, since this might be preferred by some users. The required direction of the movement might even be selectable by a user. The sensor tracks how the user moves the device and provides the information to the processing means, which present the polyhedron with a corresponding new orientation.

The possibility of rotating facets by means of a sensor can always be active. But since the user of a mobile device is constantly on the move and the graphical user interface should not bounce during all these movements, the mobile device can also have a special button or other input means for activating and deactivating the rotation.

Regardless of the employed means for enabling a user to cause the processing means to rotate the facets of a presented polyhedron, the rotation can be realized as a discrete movement or as a continuous or quasi-continuous movement. A discrete rotation ensures that there is always one facet in plan view, which facet can be considered as active facet. In case the pieces of information comprise for example different choices offered to a user, it can be provided that the respective active facet can be selected by the user via some selection means. As a result, the choice is processed by the processing means, e.g. by opening a further polyhedron presenting further pieces of information associated specifically to the selected choice, or by running some program associated specifically to the selected choice.

In case the mobile device is suited in addition to be used with a pointing device, like a pen or a mouse, the user could point with the pointing device also directly at all visible facets and thereby access them directly, since the rotation may be separated from the selection.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

BRIEF DESCRIPTION OF THE FIGURES

In the following, the invention is explained in more detail with reference to drawings, of which

DETAILED DESCRIPTION OF THE INVENTION

Figure 1:
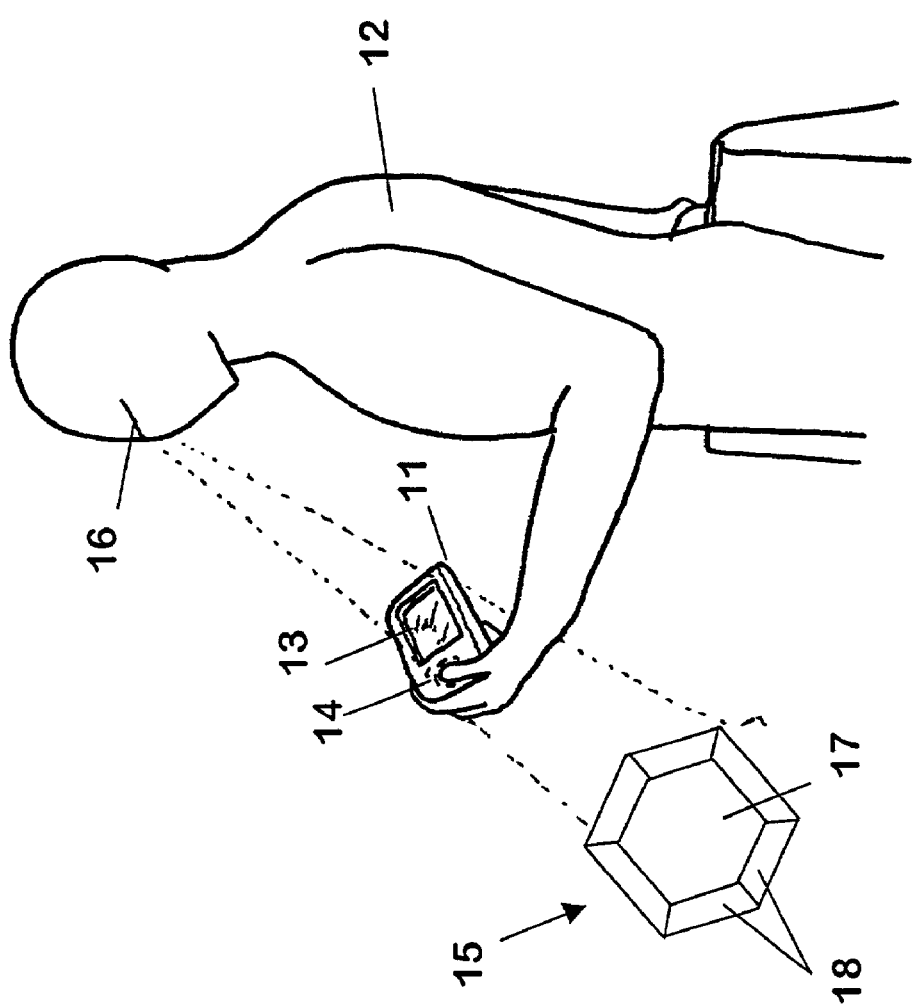
FIG. 1 illustrates the perception of a graphical UI, provided in a first embodiment of a mobile device according to the invention, by a user.

FIG. 1 is a sketch showing a first embodiment of a mobile device 11 according to the invention and a user 12 of the mobile device 11. The mobile device 11 comprises a display 13 and a plurality of buttons 14, which are not shown in detail. These buttons 14 may comprise in particular four buttons labeled with an arrow pointing up, an arrow pointing down, an arrow pointing to the left and an arrow pointing to the right. In addition, a selection button may be provided. The mobile device further comprises processing means (not shown) with implemented software.

The figure further comprises a view on a polyhedron 15 in form of a diamond, of which 7 facets are visible. This polyhedron constitutes the graphical user interface currently presented on the display 13 of the mobile device 11. The user 12, who is holding the device 11, is looking onto its display 13. Dashed lines from the eyes 16 of the user 12 to the display 13 of the mobile device 11 and further on to the polyhedron 15 illustrate the perception of the presented graphical user interface by the user 12. More specifically, the polyhedron 15 appears as a three-dimensional structure located in a space extending behind the display 13.

The user 12 sees a regular hexagonal facet 17 of the polyhedron positioned in the middle of the graphical user interface in plan view, and therefore identifies this facet as main facet. The other 6 facets 18 are perceived to be arranged around this main facet as side facets extending away from the user.

In the following, the presentation of the graphical user interface by the mobile device 11 of FIG. 1 as well as the possibilities of controlling the presented graphical user interface will be described with reference to FIGS. 2 and 3.

For presenting the graphical user interface, the processing means of the mobile device 11 first determine the number of facets of a diamond required for presenting all pieces of information available in the current state of the device 11.

The UI diamond is then built and presented on the display 13 by the processing means in a way that the visible number of facets is equal to the determined number of facets. To each of these visible facets, a piece of information is associated by the processing means. Irrespective of the determined number, the facets are always arranged in such a manner that there is one facet in the form of a regular polygon having one side less than the number of determined facets. This regular polygon is surrounded by the remaining facets. The user 12 can thus see multiple facets, or tabs, at once.

Figure 2:
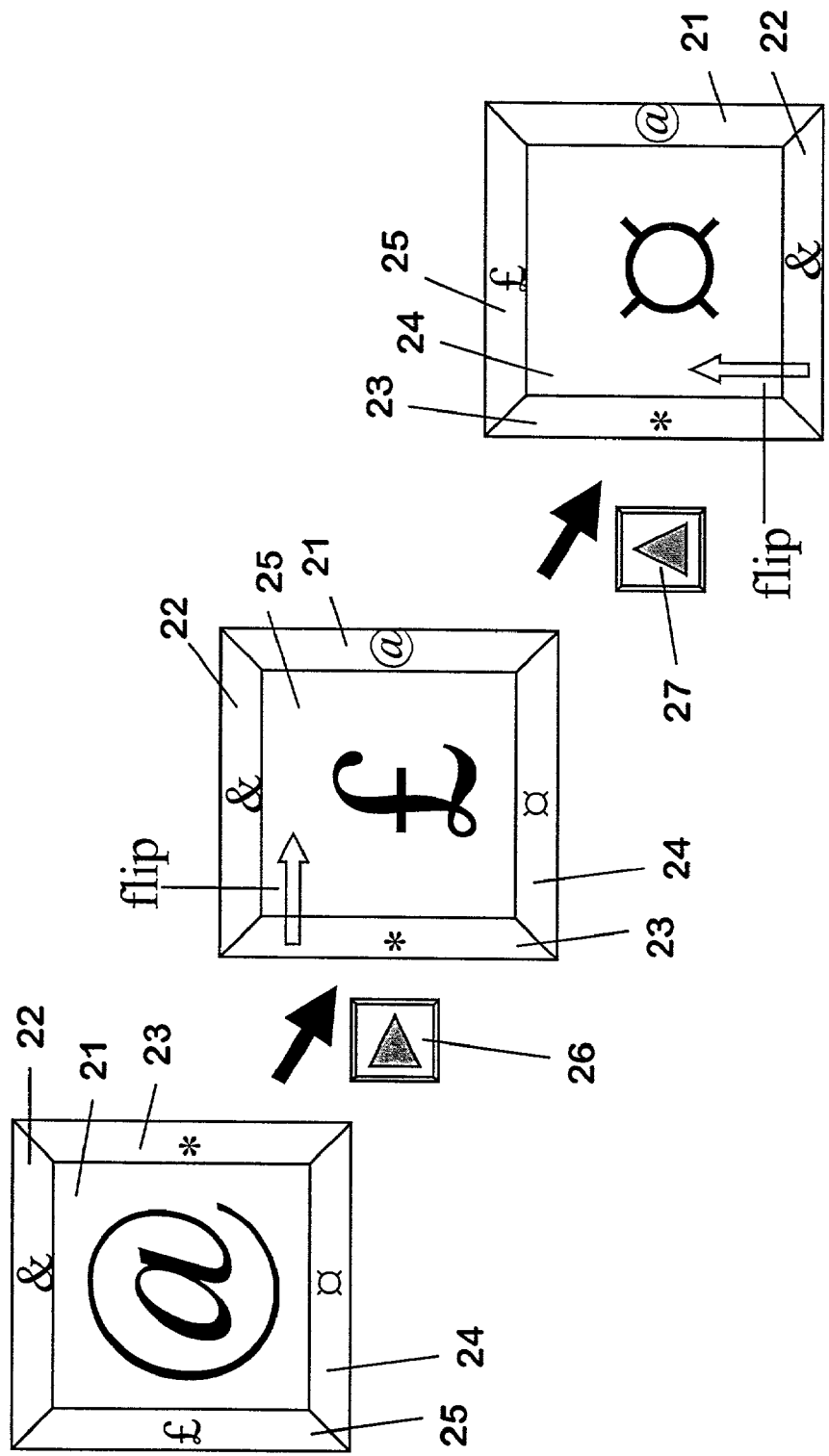
FIG. 2 shows a diamond UI with 5 visible sides provided by the mobile device of FIG. 1, and illustrates rotations of this diamond.

A more detailed first example of such a UI diamond is shown in FIG. 2, which presents three different states of the same diamond.

This UI diamond comprises 5 visible sides 21–25, each presenting a different piece of information, which pieces are represented in the figure by a different symbol @, &, *, ¤, £.

In the first representation of the UI diamond on the left hand side of the figure, a square facet 21 in the center shows the symbol @. To each side of the square facet 21, one side of a trapezoidal facet 22–25 is joint. The two sides of each trapezoidal facet 22–25 next to the side joining the square facet 21 are further joined to a respective one of the other trapezoidal facets 22–25. Proceeding from the respective side joining the square facet 21, the trapezoidal facets 22–25 seem to extend to the background, thus simulating a 3D view on the diamond. The trapezoidal facet 22 on top of the square facet 21 shows the symbol &, the trapezoidal facet 23 on the right hand side of the square facet 21 shows the symbol *, the trapezoidal facet 24 at the bottom of the square facet 21 shows the symbol ¤, and the trapezoidal facet 25 on the left hand side of the square facet 21 shows the symbol £.

The piece of information on the square facet 21 in the center can be seen clearly by the user 12, and the other four facets 22–25 are at least somewhat visible. The display 13 can be a 2D or a 3D display, but if it is a true 3D display, the user 12 can improve his view on the different facets by changing his/her viewpoint accordingly.

The different pieces of information represented by the different symbols may constitute for example different choices offered to the user 12. In case the user 12 wishes to select the choice represented by the symbol @, the user 12 may select this choice by pressing the selection button (not shown) of the mobile device 11.

However, only the choice presented by the square facet can be selected by the user 12 by pressing the selection button, since only the square facets is an active facet. In order to select another one of the choices, the user 12 first has to rotate the diamond in a way that the facet with the symbol representing the desired choice is presented as the square facet. In this first embodiment, the user 12 can rotate the diamond by pressing the buttons 14 with the arrows. In FIG. 2, two of these buttons 26, 27 are depicted for illustration by themselves, without showing their relation to the entire set of buttons 14 or to the mobile device.

In the depicted example, the user 12 wishes to select or examine more clearly the choice represented by the symbol £ and presses the button 26 with the arrow to the right. As a result, the diamond is rotated, or flipped, in a way that the facet 24 with the symbol £ appears now as front square facet 24, while the facet 21 with the symbol @ is shifted to the right hand side and the facet 23 with the symbol *, seemingly over the back of the diamond, to the left hand side. The resulting view of the UI diamond is depicted in the center of FIG. 2.

After having inspected the choice represented by the symbol £ more clearly, the user 12 may then consider that he/she might prefer the choice represented by the symbol ¤, currently located on a facet 24 on the bottom.

The user 12 therefore presses the button 27 with the arrow in upward direction. As a result, the diamond rotates in a way that the facet 24 with the symbol ¤ appears now as front square facet, while the facet 24 with the symbol £ is shifted to the top, and the facet 22 with the symbol & is shifted, again seemingly over the back of the diamond, to the bottom. The resulting view of the UI diamond is depicted on the right hand side of FIG. 2.

The buttons with the arrows pointing to the left and downwards (not shown) can be used analogously by the user for rotating the diamond in the respective other directions.

The rotation if performed discretely, i.e. the user always has one active square facet in front of him/her.

In another state of the mobile device 11, more pieces of information may have to be presented to a user 12. In this case, the shape of the UI diamond is adapted accordingly by the processing means of the mobile device 11.

Figure 3:
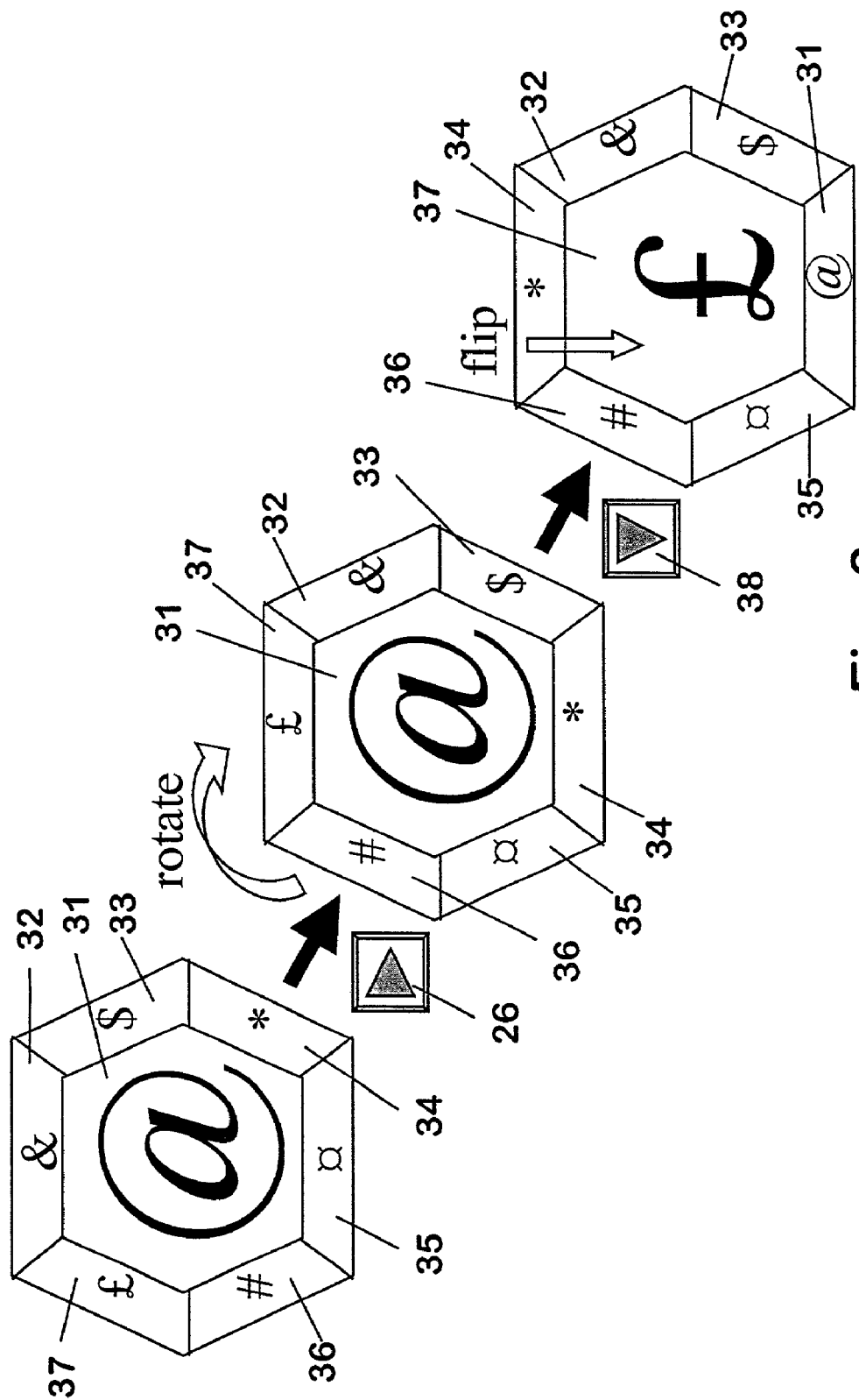
FIG. 3 shows a diamond UI with 7 visible sides provided by the mobile device of FIG. 1, and illustrates rotations of this diamond.

FIG. 3 shows a diamond with 7 visible facets for presenting pieces of information represented by 7 different symbols. The initial state of this second example of a UI diamond is shown on the left hand side of FIG. 3, which state can be changed again by the user 12.

In the initial state of the UI diamond, a regular hexagonal facet 31 presenting the symbol @ faces the user 12. Similar as with the first presented UI diamond, a trapezoidal facet 32–37 is joint to each side of the hexagonal facet 31. The two sides of each trapezoidal facet 32–37 next to the side joining the hexagon facet 31 are further joined to a respective one of the other trapezoidal facets 32–37. Proceeding from the respective side joining the hexagon facet 31, the trapezoidal facets 32–37 appear again extending to the background, thus simulating a 3D view on the diamond. Proceeding from the trapezoidal facet 32 on top of the hexagon facet, the trapezoidal facets 32–37 show in clockwise direction the symbols &, $, *, ¤, # and £.

The piece of information on the hexagon facet 31 in the center can be seen clearly by the user 12, and the other six facets 32–37 on the sides are at least somewhat visible.

The user 12 now wishes to look in more detail into the piece of information presented by the facet 37 with the symbol £. This facet 37 is located on the upper left hand side of the central hexagon 31. Since with the current diamond, there are two facets 36, 37 on the left hand side of the central facet 31, the user 12 has to take two steps in order to get the best view on the facet 37 showing the desired symbol by for moving the facet 37 into the center.

In a first step, the user 12 presses the button 26 with the arrow pointing to the right. This results in a clockwise rotation of the trapezoidal facets 32–37 of the diamond around the hexagonal facet 31. The resulting state of the UI diamond is depicted in the center of FIG. 3.

In a second step, the user 12 presses the button 38 with the arrow pointing downwards. Thereby, the facet 37 presenting the symbol £ is flipped into the center, the facet 31 presenting the symbol @ is flipped to the bottom, and the facet 34 presenting the symbol * is flipped to the top. The resulting orientation of the UI diamond is depicted on the right hand side of FIG. 3.

Similarly, the button with the arrow pointing to the left causes a counter-clockwise rotation, and the button with the arrow pointing upwards causes flipping the facets in the middle upwards.

Thus, any facet 31–37 of this diamond can be turned into the center by two steps at the most.

In case the symbols represent information on a possible choice, the user 12 may select this choice by pressing the select button (not shown), as with the first diamond.

Figure 4:
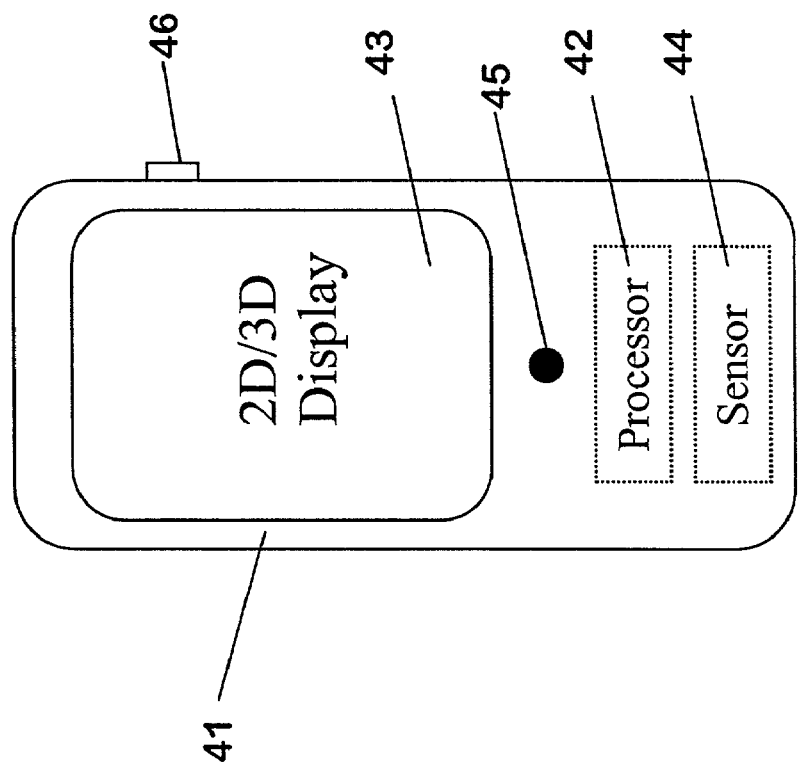
FIG. 4 shows a second embodiment of a mobile device according to the invention.

FIG. 4 presents a second embodiment of the mobile device according to the invention.

As in the first embodiment, the mobile device 41 comprises processing means 42 and a 2D or 3D display 43 for presenting a diamond build as described by way of example with reference to FIGS. 2 and 3.

The mobile device 41 further comprises a movement detecting sensor 44 which is able to detect a movement of the mobile device. This movement detecting sensor 44 can be for example an acceleration sensor, a compass or a gyroscope. In addition, the mobile device 41 comprises a selection button 45 on the front side of the mobile device 41, and a button 46 for activating/deactivating a rotation of a displayed diamond on the right hand side of the mobile device 41.

When a user wishes to rotate a presented UI diamond in order to obtain a better view on one of the facets, he/she presses the button 46 for activating a rotation. Then, the user rotates the device 41 slightly in the direction in which the UI diamond has to rotate in order to bring a desired facet to the front. The sensor 44 senses this movement and causes the processing means 42 to rotate the UI diamond accordingly. As soon as the desired facet is facing the user in plan view, the user can release the button 46 in order to deactivate the rotation. A choice presented by a facet which appears essentially in plan view can be selected by a user by pressing the selection button 45.

The rotation can be realized again as a discrete movement or as a continuous movement. In the latter case, the IU diamond does not always have an active facet appearing in plan view to the user.

Now, two different exemplary scenarios will be described, in which the first or the second presented embodiment of a mobile device 11, 41 can be employed. In both scenarios, the mobile device is a mobile phone.

In a first scenario, a user of the mobile phone wants to know a phone number stored in the phone. The user takes the mobile phone out of his/her pocket and opens the key lock. Then, he/she presses a button associated to a menu, and a diamond UI is opened, as described by way of example with reference to FIGS. 2 and 3. The presented diamond has one facet facing the user, and this facet comprises the first menu item. All other menu items are at least a little visible on the sides facets of the diamond. The user rotates the diamond as described with reference to the first or the second embodiment of the invention, until the item 'phonebook' is presented on the facet facing the user. The user opens the phonebook by pressing a provided selection button, and another diamond with different facets is opened. Each of these facets is associated to one of different groups, like 'work', 'friends', 'family', 'others' etc. From these groups, the user can select one in the same way as the item 'phonebook' from the menu items. As a result, the desired number is displayed on the display of the mobile phone.

In a second scenario, the user receives a phone call via the mobile phone. The display of the mobile phone shows a diamond UI presenting information about the caller. The structure of the diamond UI resembles again those described with reference to FIGS. 2 and 3. The main facet can present for example the name and the phone number of the caller. On the side facets of the diamond, less relevant pieces of information are presented, e.g. when the last conversation took place with this caller, detailed personal information on the caller, the last exchanged SMSes etc. The user can browse through these pieces of information by rotating the diamond as described with reference to the first or the second embodiment of the invention.

While there have shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A mobile device comprising:
 a display;
 processing means for presenting on said display a three-dimensional polyhedron as graphical user interface, wherein different pieces of information that are to be presented to a user of said mobile device are associated exclusively to all visible facets of said polyhedron, and wherein said visible facets of said polyhedron present at least a hint on a respectively associated piece of information to a user of said mobile device; and
 means for enabling a user to cause said processing means to rotate exclusively said visible facets of said presented polyhedron.

2. A mobile device according to claim 1, wherein said means for enabling a user to cause said processing means to rotate said facets of said polyhedron comprise input means enabling a user to inform said processing means about a desired rotation of said facets of said presented polyhedron.

3. A mobile device according to claim 1, wherein said means for enabling a user to cause said processing means to rotate said facets of said polyhedron comprise a movement detecting sensor, the output of said movement detecting sensor causing said processing means to rotate said facets of said presented polyhedron according to a detected movement of said mobile device.

4. A mobile device according to claim 3, wherein said means for enabling a user to cause said processing means to rotate said facets of said polyhedron comprise input means for enabling a user to enable/disable a rotation according to a detected movement of said mobile device.

5. A mobile device according to claim 1, wherein said processing means adapt the number of facets of said presented polyhedron to the number of different pieces of information that are to be presented to a user in a current status of said mobile device.

6. A mobile device according to claim 1, wherein said processing means associate said pieces of information that are to be presented to a user to visible facets of said polyhedron, and further pieces of information are associated to hidden facets of said presented polyhedron.

7. A mobile device according to claim 1, wherein said processing means, when caused to rotate said facets of said presented polyhedron, rotate said facets of said presented polyhedron in a continuous movement.

8. A mobile device according to claim 1, wherein said processing means, when caused to rotate said facets of said presented polyhedron, rotate said facets of said presented polyhedron in a discrete movement, such that always one of said facets is presented in plan view to a user.

9. A mobile device according to claim 1, wherein at least one of said different pieces of information represents a choice offered to a user, said mobile device further comprising input means for enabling a user to select a choice represented by a piece of information that is associated to a facet of said polyhedron, which facet is currently presented at least essentially in plan view to said user.

10. A mobile device according to claim 1, wherein at least one of said different pieces of information represents a choice offered to a user, said mobile device further comprising pointing means for enabling a user to select a choice represented by a piece of information that is associated to a visible facet of said polyhedron by pointing at said facet.

11. A mobile device according to claim 1, wherein said processing means present said three-dimensional polyhedron as a convex polyhedron.

12. A mobile device according to claim 1, wherein said processing means present said three-dimensional polyhedron as a concave polyhedron.

13. A graphical user interface for a mobile device, which graphical user interface is presented as a three-dimensional polyhedron on a display of said mobile device, wherein different pieces of information that are to be presented to a user of said mobile device are associated exclusively to all visible facets of said polyhedron, wherein visible facets of said polyhedron present at least a hint on a respectively associated piece of information to a user of said mobile device, and wherein said visible facets of said polyhedron can be caused by a user of said mobile device to rotate exclusively upon activation of a rotation enabling input device.

14. A graphical user interface according to claim 13, wherein the number of facets of said polyhedron depends on the number of different pieces of information that are currently to be presented to a user of said mobile device.

15. A graphical user interface according to claim 13, wherein said pieces of information that are to be presented to a user are associated to visible facets of said polyhedron, and further pieces of information are associated to hidden facets of said polyhedron.

16. A graphical user interface according to claim 13, wherein said facets of said polyhedron rotate in a continuous movement upon an initiation by a user of said mobile device.

17. A graphical user interface according to claim 13, wherein said facets of said polyhedron rotate in a discrete movement upon an initiation by a user of said mobile device, such that always one of said facets is presented in plan view to said user.

18. A graphical user interface according to claim 13, wherein at least one of said different pieces of information represents a choice offered to a user, and wherein a choice represented by a piece of information that is associated to a facet of said polyhedron, which facet is currently presented at least essentially in plan view to a user, can be selected by said user of said mobile device.

19. A graphical user interface according to claim 13, wherein at least one of said different pieces of information represents a choice offered to a user, and wherein a choice represented by a piece of information that is associated to a facet of said polyhedron can be selected by said user of said mobile device by pointing at said facet with pointing means.

20. A graphical user interface according to claim 13, wherein said three-dimensional polyhedron is presented as a convex polyhedron.

21. A graphical user interface according to claim 13, wherein said three-dimensional polyhedron is presented as a concave polyhedron.

22. A method for presenting a graphical user interface on a display of a mobile device, said method comprising:
associating different pieces of information that are to be presented to a user of said mobile device exclusively to all visible facets of a three-dimensional polyhedron;
presenting said three-dimensional polyhedron on said display as graphical user interface in a way that visible facets of said polyhedron present at least a hint on a respectively associated piece of information to a user of said mobile device; and
rotating exclusively said visible facets of said polyhedron upon an initiation by a user of said mobile device of a rotation enabling input device.

23. A method according to claim 22, wherein said step of rotating said facets of said polyhedron upon an initiation by a user of said mobile device comprises detecting an input by a user to said mobile device via input means and rotating said facets of said presented polyhedron according to said detected input.

24. A method according to claim 22, wherein said step of rotating said facets of said polyhedron upon an initiation by a user of said mobile device comprises detecting a movement of said mobile device by a user and rotating said facets of said presented polyhedron according to a detected movement of said mobile device.

25. A method according to claim 24, wherein said step of rotating said facets of said polyhedron upon an initiation by a user of said mobile device comprises determining whether a rotation is enabled or disabled by a user, said facets being rotated only in case it is determined that a rotation is currently enabled by a user.

26. A method according to claim 22, wherein said step of associating different pieces of information to different facets of a three-dimensional polyhedron is preceded by a step of determining the number of facets of said polyhedron based on the number of different pieces of information that are to be presented to a user.

27. A method according to claim 22, wherein said pieces of information are associated to visible and to hidden facets of said polyhedron, and wherein rotating said facets of said polyhedron is performed by a further step of rotating visible facets.

28. A method according to claim 22, wherein said facets of said presented polyhedron are rotated upon an initiation by a user of said mobile device in a continuous movement.

29. A method according to claim 22, wherein said facets of said presented polyhedron are rotated upon an initiation by a user of said mobile device in a discrete movement, such that always one of said facets is presented in plan view to a user.

30. A method according to claim 22, wherein at least one of said different pieces of information represents a choice offered to a user, said method comprising processing upon an initiation by said user a choice represented by a piece of information that is associated to a facet which is currently presented at least essentially in plan view to said user.

31. A method according to claim 22, wherein at least one of said different pieces of information represents a choice offered to a users said method comprising processing upon an initiation by said user a choice represented by a piece of information that is associated to a facet, wherein said initiation by said user comprises pointing at said facet with pointing means.

32. A method according to claim 22, wherein said three-dimensional polyhedron is presented as a convex polyhedron.

33. A method according to claim 22, wherein said three-dimensional polyhedron is presented as a concave polyhedron.

34. The method of claim 13 wherein the rotation enabling input device is a joystick, on or more buttons or a movement detection sensor.

35. The method of claim 22 wherein the rotation enabling input device is a joystick, on or more buttons or a movement detection sensor.

* * * * *